United States Patent [19]
Foerstner et al.

[11] Patent Number: 5,984,497
[45] Date of Patent: Nov. 16, 1999

[54] ILLUMINATION DEVICE FOR VEHICLE

[75] Inventors: Rolf Foerstner, Bodelshausen; Michael Hamm; Albrecht Duerr, both of Pfullingen; Doris Boebel, Stuttgart, all of Germany

[73] Assignee: Robert Bosch GmbH, Stuttgart, Germany

[21] Appl. No.: 08/993,295

[22] Filed: Dec. 18, 1997

[30] Foreign Application Priority Data

Dec. 14, 1996 [DE] Germany ............... 196 52 159

[51] Int. Cl.$^6$ ............... F21V 7/04; B60Q 1/00
[52] U.S. Cl. ............... 362/511; 362/543; 362/544; 362/559
[58] Field of Search ............... 362/551, 554, 362/558, 511, 543, 544, 559

[56] References Cited

U.S. PATENT DOCUMENTS

| | | | |
|---|---|---|---|
| 4,811,172 | 3/1989 | Davenport et al. ............... | 362/511 |
| 5,122,933 | 6/1992 | Johnson ............... | 362/511 |
| 5,184,883 | 2/1993 | Finch et al. ............... | 362/511 |
| 5,400,225 | 3/1995 | Currie ............... | 362/554 |
| 5,461,548 | 10/1995 | Esslinger et al. ............... | 362/554 |

FOREIGN PATENT DOCUMENTS 41 12 194 A1   10/1992   Germany .

*Primary Examiner*—Thomas M. Sember
*Attorney, Agent, or Firm*—Michael J. Striker

[57] ABSTRACT

An illumination device for a vehicle has a housing having a light outlet opening, a light-permeable cover member closing the light outlet opening of the housing, a light source arranged in the housing, a unit forming a side marker light, the a unit including at least one light guiding element in which a light emitted by the light source is uncoupled, the at least one light guiding element extending over a part of a contour of the illumination device, the light guiding element being arranged so that the light exits from the at least one light guiding element over its course from a part of an outer surface of the light guiding element.

9 Claims, 3 Drawing Sheets

ILLUMINATION DEVICE FOR VEHICLE

BACKGROUND OF THE INVENTION

The present invention relates to illumination devices for vehicles.

One of such illumination devices is disclosed for example in the German patent document DE 41 12 194 A1. The illumination device is formed as a headlight unit which has at least one light source and a light-permeable cover member. The headlight unit has a low beam headlight and a high beam headlight each provided with a light source. The headlight unit moreover has a further light source which serves for producing a side marker light and whose light is reflected from a partial region of the reflector of the high beam headlight and passes through the cover member. This partial region of the reflector of the high beam headlight can not be used for producing the high beam bundle and a cover member must be provided with special optical elements so as to produce the above described limiting light beam from the light beam reflected from the partial region of the reflector. For the operation of the side marker light components which are provided for other illuminating functions, such as the low beam light or high beam light, are utilized such as for example the reflector of the high beam or low beam headlight and the cover disk. This however negatively affects the design for performing their proper illumination functions, in particular the low beam and high beam. When only the light source for producing the side marker light is operated, only a small part of the headlight unit provides illumination.

SUMMARY OF THE INVENTION

Accordingly, it is an object of present invention to provide an illumination device for vehicle of the above mentioned general type, which avoids the disadvantages of the prior art.

In keeping with these objects and with others which will become apparent hereinafter, one feature of present invention resides, briefly stated, in an illumination device, in which the elements for forming the side marker light includes at least one light guiding element in which a light emitted by a light source is uncoupled, the at least one light guiding element extends at least over one part of the contour of the illuminating device, and the light exits from the at least one light guiding element over its course from a part of its peripheral surface.

When the illumination device is designed in accordance with present invention, the light which exits from at least one light guiding element over its course provides illumination of the illumination device over a large surface. The course of at least one light guiding element can be adjusted flexibly to the contour of the illumination device and extend over any part of the contour.

In accordance with another feature of the present invention, when the light exiting from at least one light guiding element over its contour is not sufficient to provide the prescribed light beam, at least one further light guiding element is provided from which the light exits from its end side.

In accordance with still a further feature of present invention, the light exiting from the end side of at least one further light guiding element is used for producing required high illumination intensities in the region of the optical axis.

In accordance with still another feature of present invention, the light exiting from at least one light guiding element and at least one further light guiding element can satisfy the requirements for the side marker light, since in the event of uncoupling of the light emitted by different light sources, the light emitted by at least one first light guiding element and by at least one further light guiding element must satify the corresponding requirements.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
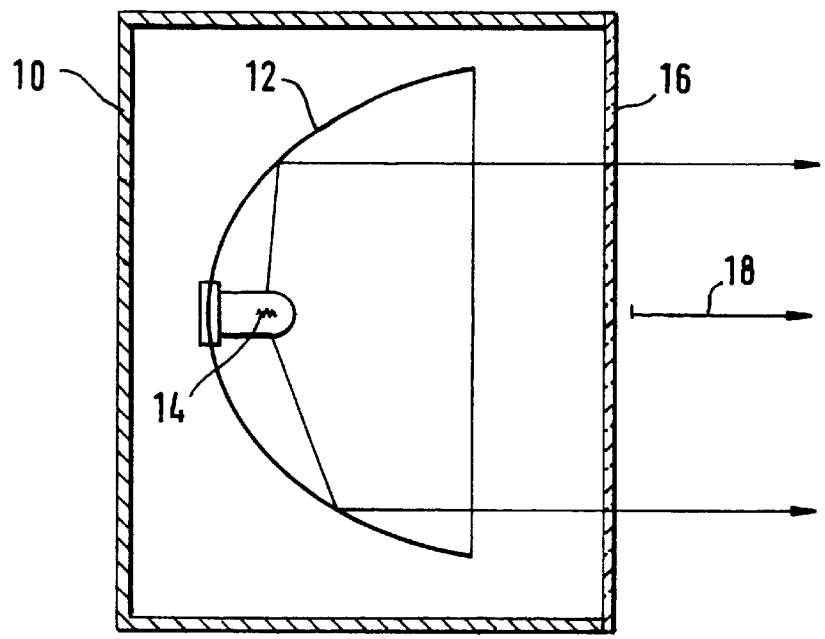
FIG. 1 is a view showing a horizontal longitudinal section of an illumination device in accordance with present invention.

An illumination device for a vehicle, in particular a motor vehicle, formed in accordance with the present invention is shown in FIG. 1. It can be formed for example as a headlight for a low beam light and/or high beam light and/or fog light. The illumination device can be alternatively formed as a headlight unit which performs several above mentioned illumination functions. For example, the illumination device shown in FIG. 1 is a headlight which is arranged in a known manner at the front end of the vehicle.

The headlight has a housing 10, a reflector 12 arranged in the housing, a light source 14 which is formed as an incandescent lamp, or a gas discharge lamp inserted in the reflector. The housing 10 has a light outlet opening which is covered with a light-permeable member formed as a disk 16. The light permeable disk 16 can be composed of glass or synthetic plastic material. The cover disk 16 can be smooth or can be provided with optical elements which deviate the light reflected by the reflector 12 during passage through the cover disk 16.

The headlight also performs the functions of a side marker light which operates for marking forwardly the contour of the vehicle. The legal prescriptions for the limiting side marker lights are provided for Europe in the ECE Regulation 7 and for Germany in the StVZ0 paragraphs 51 and 52. In these regulations it is determined what illumination intensities in what regions must be produced by the light emitted by the limiting lights, and in which directions a visibility of the light emitted by the side marker lights is required.

Figure 2:
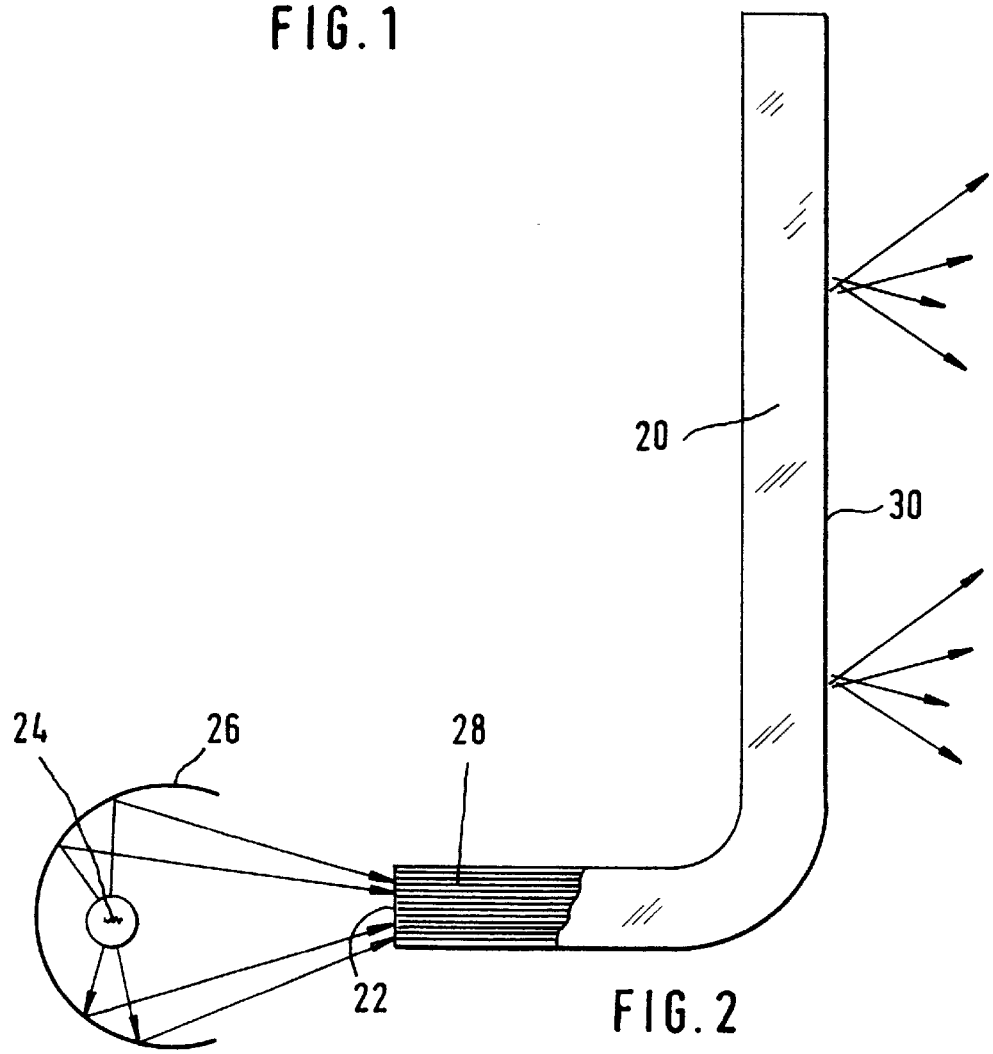
FIG. 2 is a view showing a first embodiment of a light guiding element of the inventive illumination device.

FIG. 2 is a view showing a first embodiment of the realization of the side marker light on the headlight. A light guiding element 20 is provided and arranged so that a light emitted by a light source 24 is uncoupled at its one end 22. A separate light source, and not the light source 14 for the headlight, is utilized for the light source 24. It can be for example an incandescent lamp. Additionally reflector 26 can be provided, so that the light emitted by the light source 24 is concentrated on the inlet end 22 of the light guiding element 20, and a maximum possible part of the light emitted by the light source 24 can be uncoupled. The reflector 26 can have at least approximately an ellipsoidal shape. The light source 24 can be arranged in the region of a first focal point of the reflector 26, and the inlet end 22 of the light guiding element 20 can be arranged in the region of the second focal point of the reflector 26. The light source 24 and the reflector 26 can be arranged in the housing 10 of the headlight, in which also the inlet end 22 of the light guiding element 20 is inserted. Alternatively, the light source 24 and the reflector 26 can be however arranged outside of the headlight and in some cases in an own housing. The light guiding element 20 can be arranged on the cover disk 16 or on the edge of the headlight housing 10.

The light guiding element 20 can be composed of several light guiding fibers 28 which are made of glass or synthetic plastic material. Alternatively, the light guiding element 20 can be composed of a single light guiding fiber with a corresponding greater cross-section. The light guiding element 20 has the property that the light uncoupled in it exits at least approximately uniformly over its course, at least from a part of its peripheral or exterior surface 30. Such light guiding elements are used for example in inner space illumination of buildings. The light guiding element 20 is guided over at least a part of the contour of the headlight and arranged inside the housing 10 or outside the housing 10. Preferably at least the greater part of the light exits from the region or peripheral or exterior surface 30 of the light guiding element 20 as seen in the light outlet direction 18 of the headlight, so that a light radiation of the light guiding element 20 is performed substantially in the light outlet direction 18. The light guiding element 20 extends preferably near the edge of the cover disk 16 or the headlight housing 10, so that the light reflected from the headlight reflector 12 is not affected or affected only a little.

Figure 3:
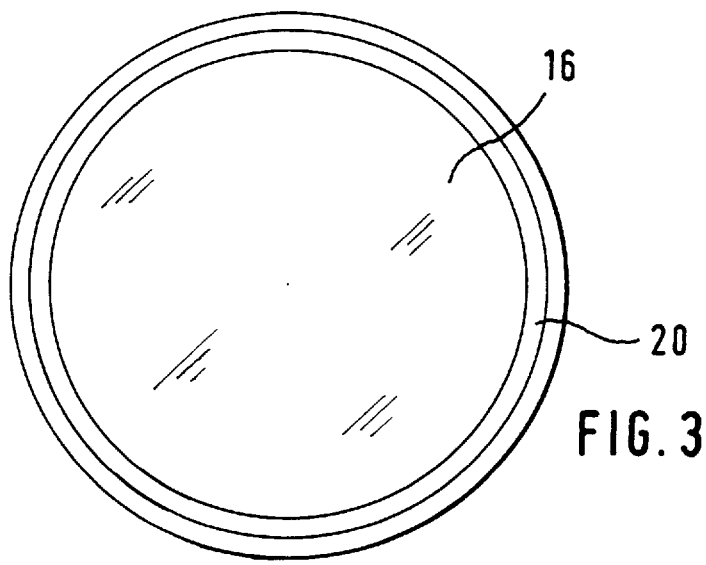
FIGS. 3–5 are views showing the illumination device with different variants of the course of the light guiding element.
Figure 4:
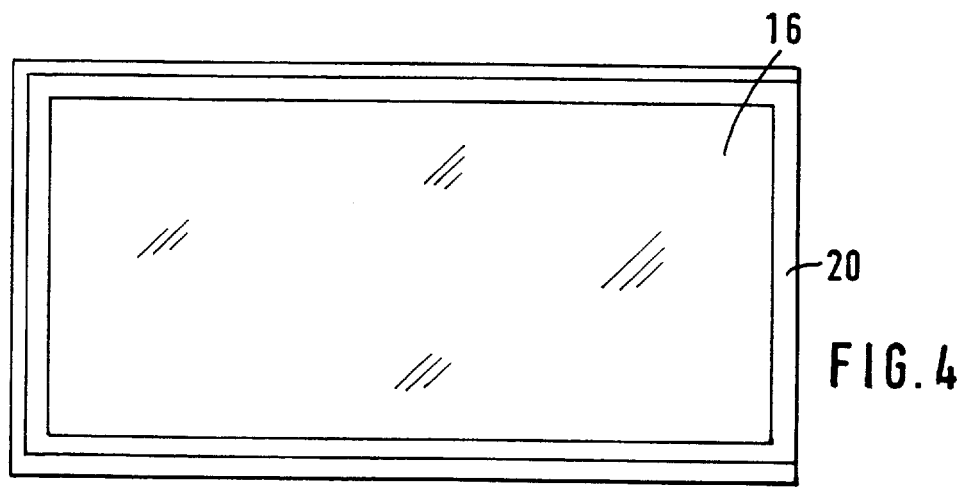
Figure 5:
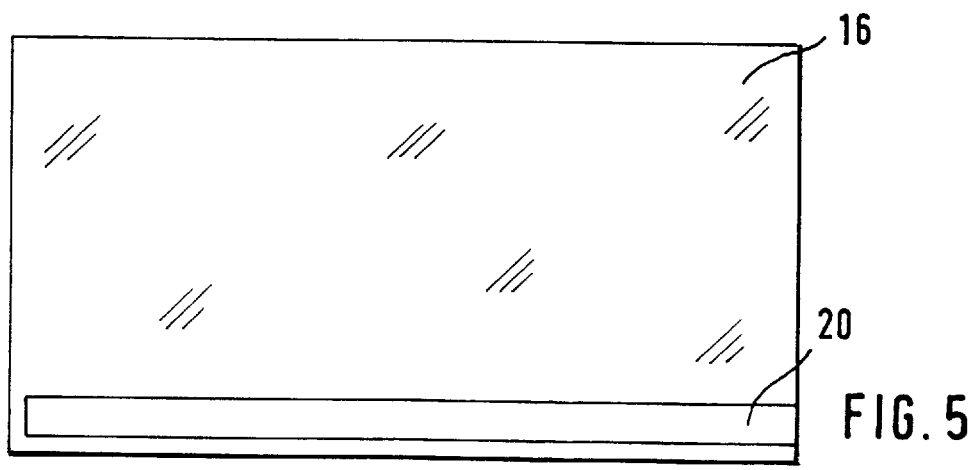

FIG. 3 shows a headlight in the front view, and the headlight here has a round shape. The light guiding element 20 extends over the whole contour of the headlight near the edge of the cover disk 16 and is arranged on the cover disk 16 or on the edge of the headlight housing 10 which surrounds the edge. In the variant shown in FIG. 4, the headlight has a substantially rectangular shape. The light guiding element 20 extends over the total contour of the headlight near the edge of the cover disk 16. In the variant shown in FIG. 5 the light guiding element extends, in deviation from the light guiding element 20 of FIG. 4, only along a longitudinal side of the headlight near the lower edge of the cover disk 16. It is to be understood that any other courses of the light guiding element 20 can be provided. The course of the light guiding element 20 on the one hand can be adapted to the desired appearance image and on the other hand can be adjusted in correspondence with the requirements of the light distribution.

Figure 6:
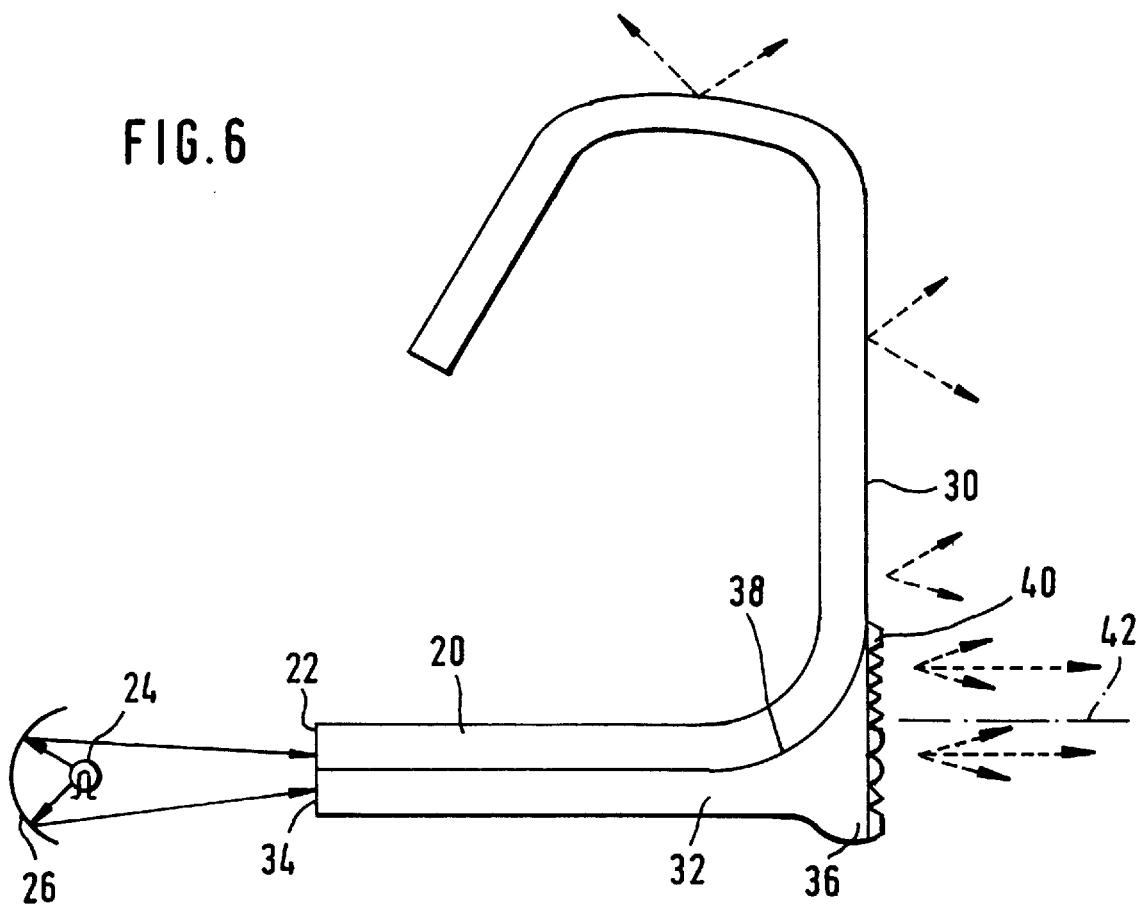
FIG. 6 is a view showing the light guiding element of the illumination device in accordance with a second embodiment of the invention.

FIG. 6 shows a second embodiment of the realization of the side marker light on the headlight. Here in addition to the at least one light guiding element 20, at least one further light guiding element 32 is provided. The further light guiding element 32 is formed as a so-called bar optics and has for example a shape of a cylinder. The further light guiding element 32 can be composed of glass or synthetic plastic material, in particular of PMMA, polymethylmethacrylate or PC polycarbonate. The light emitted by the light source 24 is uncoupled by the inlet end 34 of the further light guiding element 32. The inlet end 22 of the light guiding element 20 and the inlet end 34 of the further light guiding element 32 are arranged closely near one another, and the light emitted by the light source 24 is uncoupled by the reflector 26 both in the inlet end 22 of the light guiding element 20 and in the inlet end 34 of the further light guiding element 32. It is important that the light emitted from the single light source 24 is uncoupled both in the light element 20 as well as in the further light element 32, and no separate light sources are utilized for uncoupling in the light element 20 and the further light element 32.

The light element 20 and the further light element 22 extend first parallel. Near the light outlet opening of the headlight the further light element 32 ends with its end-side outlet end 36, while the light element 20 as in the first embodiment, extends approximately over a part of the contour of the headlight. The further light element 32 expands toward its outlet end 36 as a funnel. It can have a concavely curved region 38, along which the light element 20 is guided, so as to deviate the light guiding element 20 so that in its further course it is arranged substantially perpendicular to the light outlet opening 18 of the headlight. The course of the light element 20 on the contour of the headlight can have the shape shown in FIGS. 3–5 or any other shape.

The light exiting from the outlet end 36 of the further light element 32 extends at least approximately in the light outlet direction 18 of the headlight. At the outlet end 36, an uncoupling lense can be provided. It can be have optical elements 40, so that the light exiting the outlet end 36 of the further light element 32 passes through them. The optical elements 40 can be arranged on the cover disk 15 of the headlight, when the outlet end 36 is arranged in the headlight housing 10. Alternatively, the optical elements 40 can be also arranged on a separate disks, or as shown in FIG. 6, directly on the outlet end 46. They can be formed of one-piece with the further light guiding element 32. The light exiting the outlet end 36 of the further light element 32 is preferably concentrated in the region of the optical axis 42, or in other words of the central axis of the outlet end 36, for providing high illumination intensity there.

Figure 7:
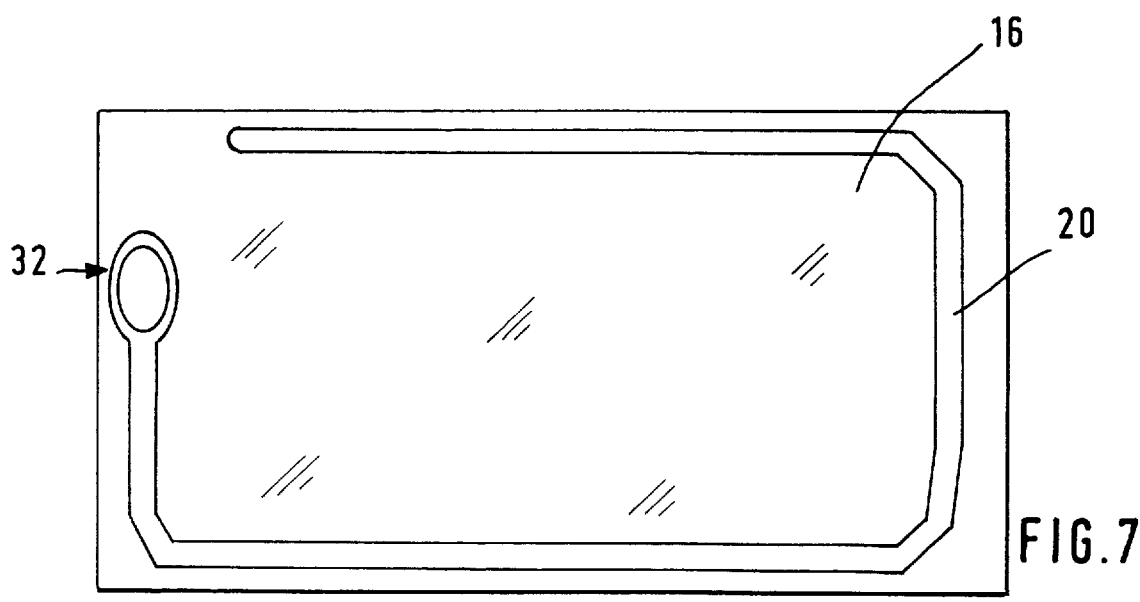
FIG. 7 is a view showing the illumination device with a course of the light guiding element.

FIG. 7 shows a front view of the headlight having a substantial rectangular shape. The light guiding element 20 extends at least approximately over the whole contour of the headlight near the edge of the cover disk 16. The outlet end 36 of the further light element 32 is arranged near a side edge of the cover disk 16. Preferably, the outlet end 36 is arranged near a lateral edge of the cover disk 16, which is spaced the most from the longitudinal central axis of the vehicle, or in other words near the lateral end of the vehicle front.

It will be understood that each of the elements described above, or two or more together, may also find a useful application in other types of constructions differing from the types described above.

While the invention has been illustrated and described as embodied in illumination device for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An illumination device mountable on a front end of a vehicle, comprising a housing having a light outlet opening;

a light-permeable cover member closing said light outlet opening of said housing; a light source arranged in said housing and producing a light which exits through said light outlet opening; means forming a side marker light, said means including an additional light source and at least one light guiding element in which a light emitted by said additional light source is uncoupled, said at least one light guiding element extending over a part of a contour of the illumination device, said light guiding element being arranged so that the light exits from said at least one light guiding element over a course of said at least one light guiding element from a part of an outer surface of said light guiding element and therefore over a part of a contour of the illumination device.

2. An illumination device as defined in claim 1, wherein said at least one light guiding element is formed so that the light exiting from said at least one light guiding element is at least approximately uniformly distributed over said course.

3. An illumination device as defined in claim 1, wherein said light guiding element is formed so that at least a greater part of the light exiting from said outer surface of said at least light element extends in a light outlet direction of the illumination device.

4. An illumination device as defined in claim 1, wherein said at least one light guiding element is arranged in said course over a contour of the illumination device on said cover member.

5. An illumination device as defined in claim 1, wherein said at least one light guiding element is arranged in said course on a contour of the illumination device on said housing.

6. An illumination device as defined in claim 1, wherein said means for forming the side marker light include at least one further light element in which the light emitted by said light source is uncoupled and which has an end arranged on a contour of the illumination device so that the light exits from said end.

7. An illumination device as defined in claim 6, wherein said at least one further light guiding element is arranged so that the light exiting from said end of said at least one further light guiding element is concentrated in a region of an optical axis of said end.

8. An illumination device as defined in claim 6; and further comprising at least one optical element arranged so that the light exiting from said end of said at least one further light guiding element passes through said at least one optical element and is deviated by said at least one optical element.

9. An illumination device as defined in claim 6, wherein said light guiding elements are arranged so that the light emitted by said light source is uncoupled in said at least one light guiding element and in said at least one further light guiding element.

\* \* \* \* \*